United States Patent Office 3,101,014
Patented Aug. 20, 1963

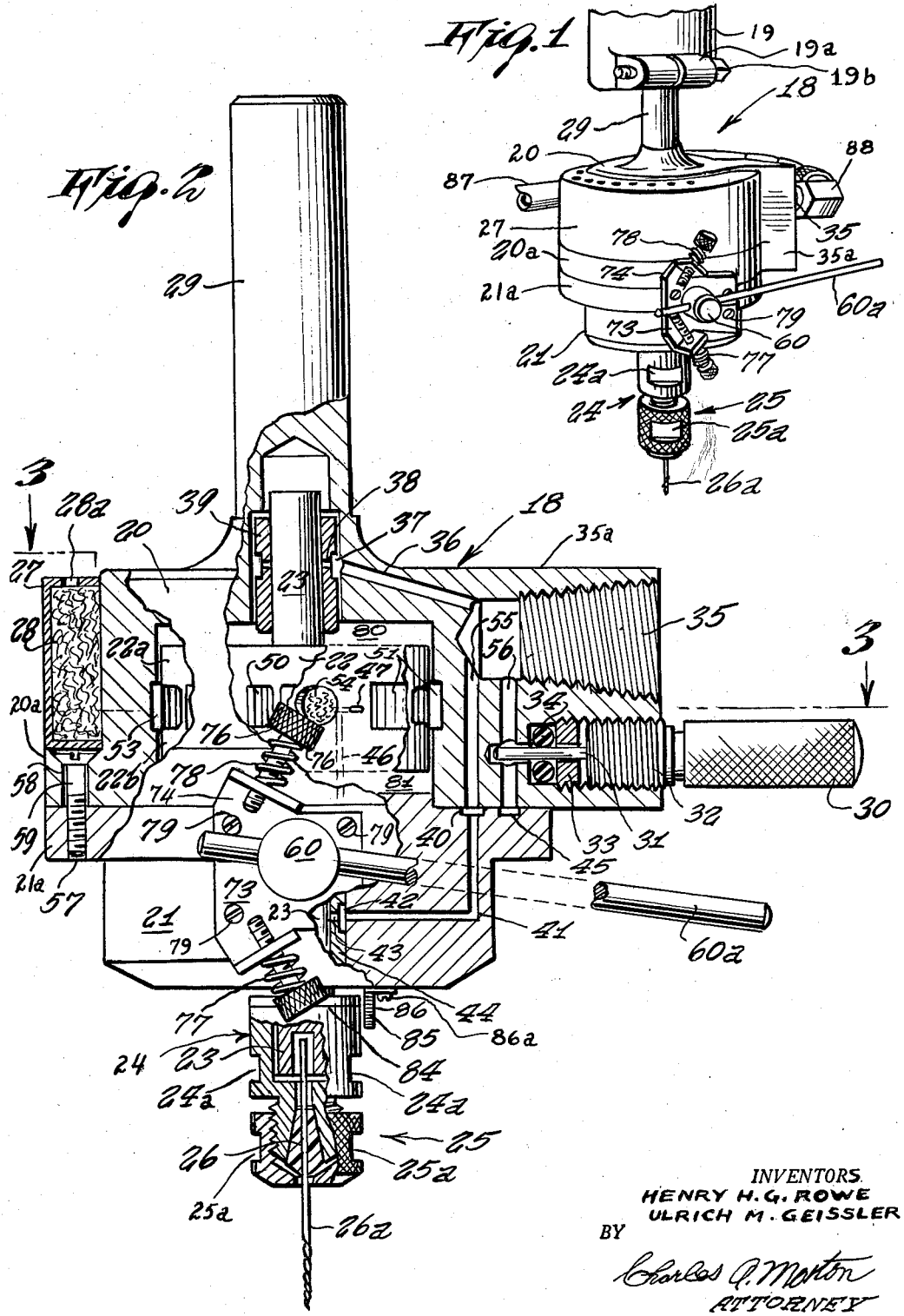

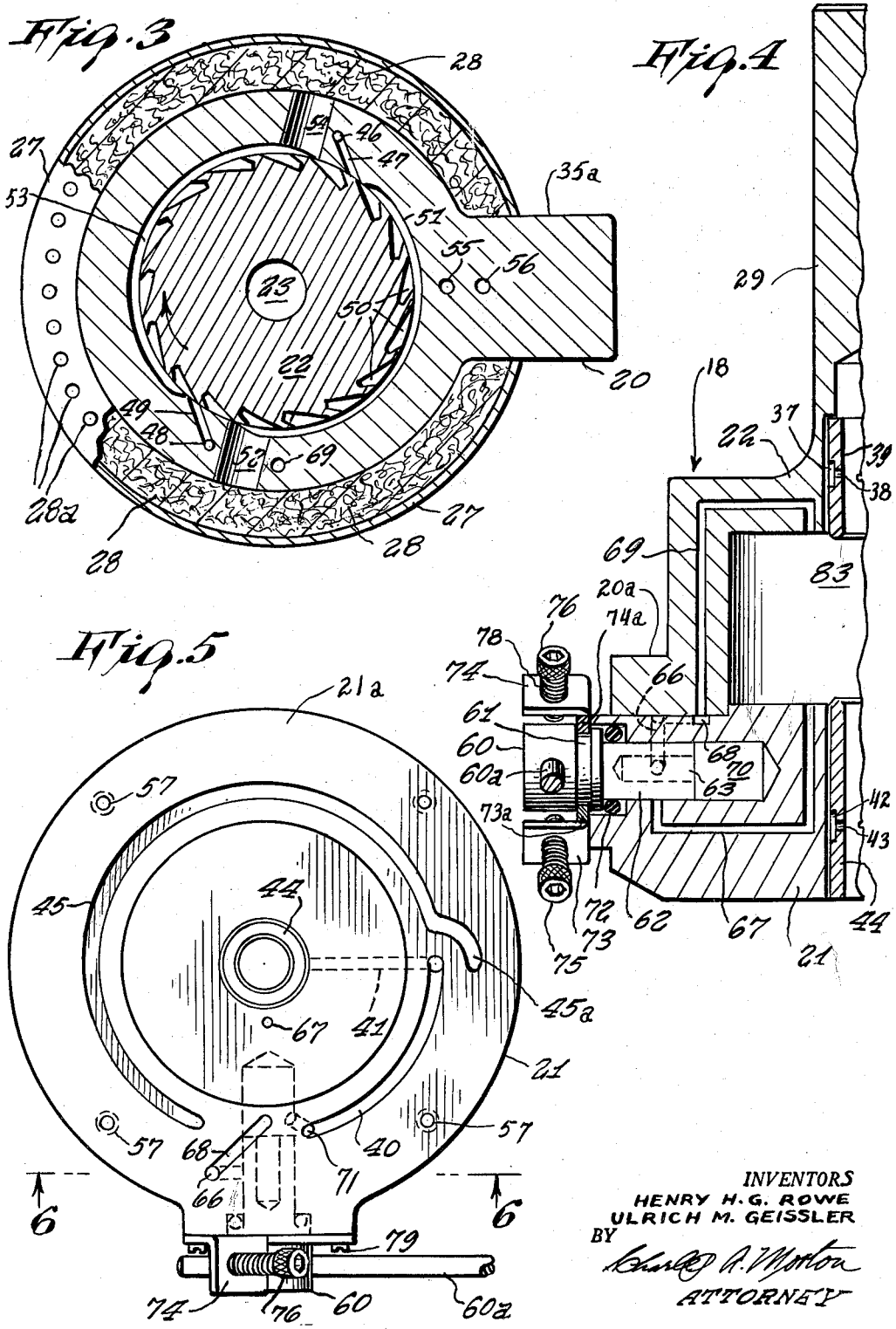

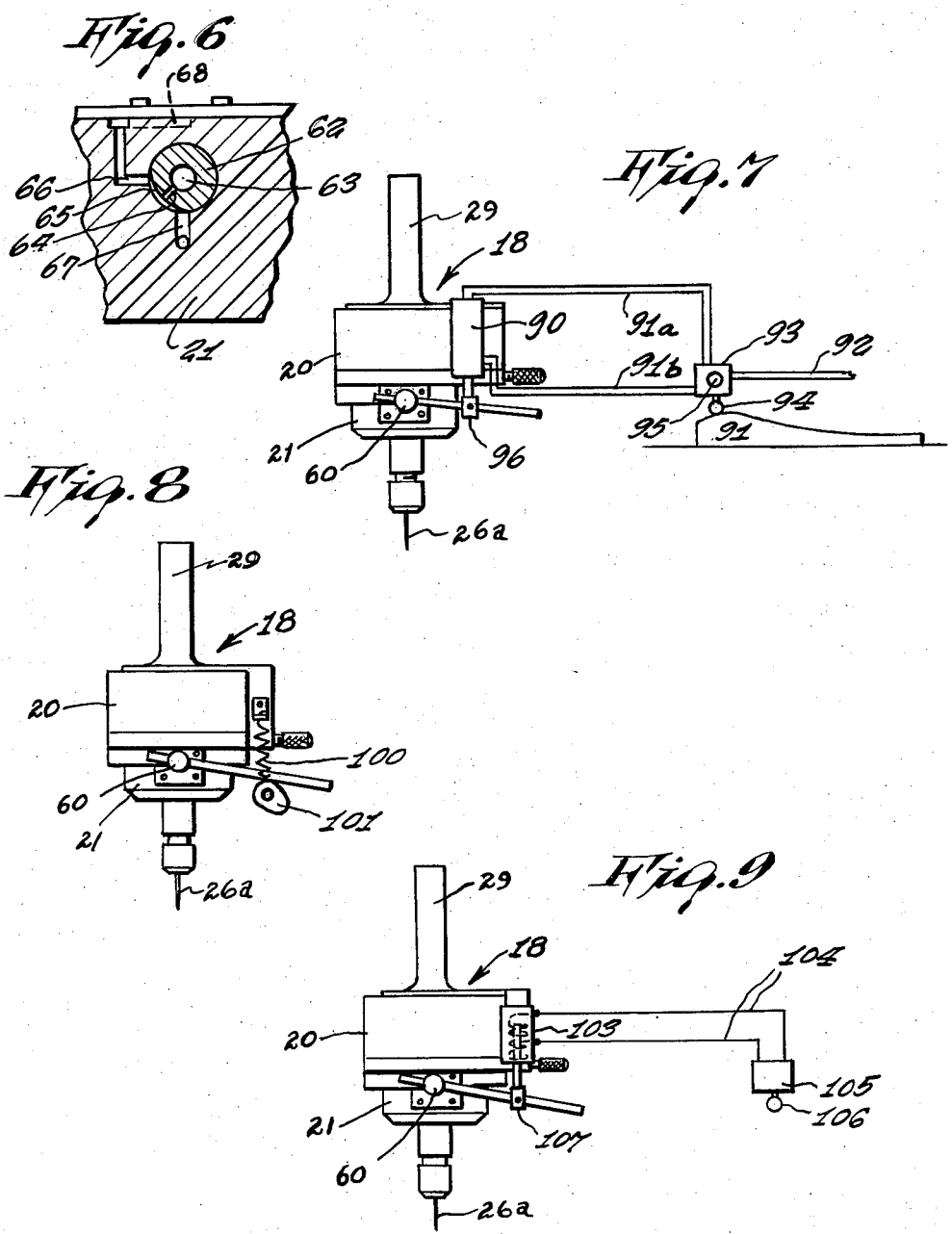

3,101,014
ULTRA-HIGH-SPEED PNEUMATICALLY DRIVEN MACHINE TOOLS, SUCH AS DRILLS AND THE LIKE
Henry H. G. Rowe, 4 Southard St., Baldwin, N.Y., and Ulrich M. Geissler, 211 Sportsman Ave., Freeport, N.Y.
Filed Oct. 2, 1961, Ser. No. 142,341
21 Claims. (Cl. 77—33.5)

This invention relates to improvements in air-driven motors or air turbines, and more particularly to improvements in air-motor driven machine tools, such as air-powered drills, grinders, and the like.

One object of this invention is an air-powered, reciprocating, rotary, variable speed, engine.

Another object is a reciprocating, rotary, air-powered, turbine.

Another object is a variable speed, reciprocating, rotary engine, comprising an air-powered and air-controlled turbinated piston.

Another object is a self-contained wide-range variable speeed, air-powered, turbinated, reciprocating, motor, which is particularly useful for ultra-high-speed, precision drilling, of exceedingly small holes.

Another object is to so combine and correlate an air-powered, turbinated piston with a selective control valve therefor in a chambered housing, as to create a machine tool whose housing may be either movably or fixedly supported with respect to the work to enhance the utility and the range of the tool.

Another object is an automatic pneumatic drilling device which is precision controlled to operate at varying speeds from low to ultra high, and which is adapted to move the drill axially towards and away from the work irrespective of the drill speed.

Another object is a turbine drill wherein the turbine also operates as a piston within the turbine chamber.

Another object is a turbine drill which telescopes axially responsive to variations in pressure to drill while the turbine is revolving, at speeds which can be varied during, and independently of, said telescopic action.

Another object is a compressed air powered turbine which telescopes as it rotates in bearings which are continuously lubricated and cooled by a lubricant-coolant comprising oil in suspension in compressed air.

Another object is a variable speed, telescopic, air-powered, turbine, whose speed of rotation, and telescopic action, are selectively, independently, air-controlled.

Another object is an air-powered and variable-speed reciprocating turbine whose speed of rotation, and the direction and extent of whose axial movement, are selectively, and independently, air-controlled.

Another object is a variable-speed turbine, useful as a drill, and comprising a piston which is both rotatable and axially movable up and down with respect both to a turbine holding means and to the work.

Another object is an air-powered, reciprocating, rotary, variable-speed, engine, which reciprocates with a controlled and cushioned air action.

Another object is a reciprocating, variable-speed, rotary engine, which is pneumatically actuated, and whose reciprocating stroke is variable and is pneumatically cushioned at all times at all engine speeds.

Another object is a reciprocating, variable-speed, air-driven turbine, whose axial stroke is pneumatically cushioned, and variable at any speed of the turbine.

Another object is a reciprocating, variable-speed, air-driven turbine, whose reciprocating stroke is pneumatically cushioned and controlled, independently of speed variations of the turbine.

Another object is the suppression of the noise generated by an air-driven turbine.

Another object is an improved collet for securely holding the stems of miniature-sized drills.

Another object is a reciprocating, variable-speed, air-driven turbine of but few and simple parts, which is easy and economical to manufacture, readily assembled and disassembled, positive in operation, and very efficient and durable in use.

Other objects will appear from the detailed description.

In the drawing:

FIG. 1 is a perspective view of one form of the invention, depending from a suitable support therefor.

FIG. 2 is a side elevation of the device of FIG. 1 partially broken away and partly in cross section, with the support omitted.

FIG. 3 is a cross section partly in plan, taken along the line 3—3 of FIG. 2, looking in the direction of the arrows.

FIG. 4 is a vertical cross sectional view of a fragment of the housing portion of the device of FIG. 2, with the turbine omitted.

FIG. 5 is a top plan view of the lower portion of the housing of the device of FIG. 2.

FIG. 6 is a cross sectional view of a fragment, taken along the line 6—6 of FIG. 5, looking in the direction of the arrows.

FIG. 7 diagrammatically illustrates the invention modified for automatic operation as in mass production of work; and FIGS. 8 and 9 diagrammatically illustrate two other modified forms of automatic control devices, suitable for use to effect mass production of work.

Like reference characters designate corresponding parts throughout the several figures of the drawing.

The housing of the air-powered turbine 18 is provided with a shank 29 by means whereof the housing for the turbine may be mounted in any standard machine, fixture, or stand 19, which may be equipped with a split socket 19a for receiving the shank 29, and the socket 19a may be tightened by a clamping screw 19b.

The turbine 18 includes an upper housing 20 and a lower housing 21 which cooperate and in conjunction define a chamber 83 (FIG. 4) wherein the turbine rotor 22 is mounted in such manner that it is free to rotate upon its spindle 23 which is journalled to rotate in, and to telescope axially between, two bushings which constitute the upper bearing 39 and the lower bearing 44 for the spindle 23. The bushings are press fitted in two centrally disposed, oppositely spaced holes, formed in the upper, and the lower, housings, 20 and 21; and when the housings are in correct registry to complete the chamber 83, the said bushings form the bearings 39 and 44 wherein the spindle 23 is journalled to rotate and to telescope axially.

The housings 20 and 21 in conjunction define the chamber 83 (FIG. 4). The chamber 83 is longer, axially, than the turbine rotor 22 to permit axial, or telescopic, movement of the rotor 22 up and down, between, and limited by, the spacing between the bearings 39 and 44. The housings 21 and 22 are each provided with a laterally projecting, substantially annular flange 20a (FIG. 2), and 21a (FIGS. 2 and 5) by which the housings may be brought into correct registry, and may then be secured together by the screws 59, 59 of which only one is shown in FIG. 2. The lower end of the spindle 23 extends through the lower bearing 44 and projects through the bottom of the lower housing far enough to receive a drill holder such as the collet sleeve 24 (FIG. 2). The collet sleeve 24 may be secured upon the spindle 23 in any suitable manner, as with a pressed fit. The nose of the collet sleeve 24 is male threaded to receive a female threaded drawcap 25, by means whereof a tapered collet 26 composed of a compressible plastic, or like resilient material, is retained within a tapered socket formed in the nose of the collet sleeve 24. The collet 26, and the lower end of the spindle 23 are bored axially to slidably receive the shank of a drill 26a. The collet 26 is sufficiently elastic when compressed by the cone joint between the male cone formed at the end of the collet and the female cone formed in the nose of the drawcap 25, to lock the shank of the drill 26a to the collet 26 and the collet to the collet sleeve 24. Collet sleeve 24, and drawcap 25, are each provided with wrench-flats 24a, and 25a, respectively, by means whereof the drawcap 25 may be adjusted along the collet sleeve 24 to lock the drill 26a in the collet 26, and the collet 26 in the collet sleeve 24.

A muffler consisting of a substantially horseshoe-shaped housing 27 substantially C-shaped in cross section, is seated upon the upper face of the laterally projecting, substantially horseshoe shaped, flange 20a of the upper housing 20. The housing 20 is also provided with a laterally projecting protuberance or shoulder 35a (FIG. 3) and the opposite ends of the housing 27 of said horseshoe shaped muffler embrace the side walls of the shoulder 35a (FIG. 3), to detachably clamp the muffler housing 27 upon the upper housing 20. The C-shaped channel in the muffler housing is loosely packed with fibre glass 28, or the like, and this packing muffles and suppresses audible tones generated by the passage of the compressed air through the turbine rotor 22. A series of holes 28a formed in the wall of the housing 27 allows the compressed air which filters through the fibre glass 28 to escape to atmosphere.

Compressed air for operating the air-powered engine is supplied from a compressed air line 87 (FIG. 1) which is coupled by a male threaded coupling 88 in the female threaded air inlet 35 (FIG. 2). The air inlet 35 is connected by a valve passage 56 in the upper housing 20 with the tail 45a of the flow groove 45 formed in the upper face of the laterally projecting substantially annular flange 21a of the lower housing 21 (FIGS. 2, 3, and 5). The valve passage 56 is controlled by a needle valve 30 (FIG. 2), having a valve stem 31 which is adjustable across the valve passage 56 to constrict the flow of compressed air through said valve passage to the tail 45a of the flow groove 45 (FIG. 5). The flow groove 45 is concentric with the turbine chamber, and extends over an arc greater than a semi-circle (FIG. 5). The needle valve 30 is male threaded at 32 for adjustment axially in the female threaded portion of the stepped hole through which the valve stem 31 passes, thus causing the valve stem 31 to variously constrict the valve passage 56. The valve stem 31 is sealed against leakage of air around said stem by an O-shaped sealing ring composed of rubber or other suitable compressible material which surrounds the valve stem 31 and is compressed against said valve stem 31 between the wall of the stepped hole through which the valve stem passes and the O-shaped male threaded retainer ring 33 which is screwed into the female threaded inner end of said stepped hole to compress the sealing ring 34 and seal off air leakage around valve stem 31.

From the air inlet 35 airflow passages or ducts extend through the wall of the upper housing in several different directions, and some of them connect with airflow grooves or airpassages formed in the body of the lower housing 21.

As previously stated, when the upper, and lower, housings 20, and 21, are brought together in correct registry, and the assembly screws 59, 59 (FIG. 2) are inserted through the clearance hole 58 and screwed into the tapped holes 57, the flanges 20a and 21a cooperate to complete the turbine cylinder chamber and to effect an airtight seal between the correlated walls thereof.

The airflow passage between valve passage 56 and the flow groove 45 and which is under the control of the needle valve 30 has already been described. Flow groove 45 circles around the upper face of the flange 21a of the lower housing 21 and registers with the flow passages 46 and 48 (FIG. 3) which extend upwardly through the body of the upper housing 20 some 180 degrees apart to join the air nozzles 47 (FIGS. 2 and 3) and 49 (FIG. 3). The nozzles 47 and 49 pass through the cylindrical wall of the turbine chamber 83 (FIG. 3) to register with the turbine buckets 50, 50; see also the nozzle 47 in registry with the turbine buckets 50 in FIG. 2. The air nozzles 47 and 49 enter the turbine chamber 83 (FIG. 4) at two diametrically opposite points spaced 180 degrees apart (FIG. 3), and the nozzles are inclined at an angle corresponding substantially with the angle of inclination of the turbine buckets 50, 50 to feed compressed air into the buckets in succession in their direction of rotation, and thus impart rotary motion in the direcion of the arrow in FIG. 3, to the turbine 22. Two separate expansion cavities 51 and 53 extend part way around the wall of the turbine chamber at the level of the air nozzles 47 and 49. The expansion cavity 51 extends clockwise around the cylindrical wall of the turbine chamber 83 from a point slightly forward of the nozzle 47 and connects with an exhaust port 52 slightly less than 180 degrees beyond the mouth of the nozzle 47. The expansion cavity 53 likewise extends clockwise around the cylindrical wall of the turbine chamber 83 from a point slightly forward of the nozzle 49 and connects with an exhaust port 54 slightly less than 180 degrees beyond the mouth of the nozzle 49. The expansion cavities 51 and 53 permit the compressed air expressed through the nozzles 47 and 49 into the buckets 50, 50 to expand as it circulates clockwise around the turbine chamber towards the exhaust ports 52 and 54, respectively.

The exhaust ports 52 and 54 exhaust into the loose fibrous material 28 which fills the muffler housing 27, and the compressed air, exhausted through said exhaust ports, filters through the muffler filling material 28, and vents to atmosphere through a series of vent holes 28a (FIGS. 2 and 3).

The compressed air expressed through the nozzles 47 and 49 into the turbine buckets 50, 50 causes the turbine 22 to rotate clockwise, and its speed of rotation is controlled by adjusting the needle valve 30 thus moving its valve stem 31 across the valve passage 56 to variously throttle valve passage 56 and thus regulate the rate of airflow therethrough. As the throttle is opened, the speed of rotation of the air-turbine 22 is increased. The needle valve 30 is quickly adjustable by the operator without the use of special tools to effect a precise setting of the speed of the drill 26a to suit the requirements of the particular work.

Atomized oil suspended in the compressed air supplied through the compressed air line 87 cools and lubricates the bearings 39 and 44, and the spindle 23 of the turbine 22, in the following manner. As best shown in FIG. 2, the air inlet 35 connects directly with two airpassages 36 and 55 which completely bypass the needle valve 30. The passage 36 (FIG. 2) extends upwardly from the air inlet 35 into the cavity which accommodates the bushing which forms the upper bearing 39, and a flow cavity 37 encircles said bushing and connects with the flow passages 38, 38 which extend through the annular wall of the bushing into the interior of the bearing 39 to the face of the spindle 23. Atomized oil suspended in the compressed air supplied from the compressed air line 87 through the air inlet 35 thus circulates around and lubricates the bearing 39 and the spindle 23, the oil in suspension in the compressed air acting as a lubricant, and the compressed air as a coolant, for the bearing and for the spindle 23 journalled in said bearing. The flow passage 55 extends downwardly through the wall of the upper housing 20 and registers with the flow groove 40 (FIG. 2) formed in the annular flange 21a of the lower housing 21 (FIG. 5). The flow groove 40 circles counter-clockwise and connects with a flow passage 41 which extends radially inwards (FIGS. 2 and 5) and connects with the cavity which accommodates the bushing which forms the bearing 44. A flow cavity 42 encircles the bushing and connects with the cross holes 43 which pass through the annular wall of the bushing into the lower bearing 44 and to the face of the spindle 23. The atomized oil in suspension in the compressed air thus circulates around the bearing and the spindle, the atomized oil acting as a lubricant, and the compressed air as a coolant, for the lower bearing 44 and for the spindle 23.

The flow groove 40 (FIG. 5) curves around the upper face of the flange 21a of the lower housing 21 through an arc of approximately 90 degrees to connect with a flow passage 71 which terminates in the cavity formed at the inner end of the bore 70 wherein the control valve 60 (FIGS. 2, 4, and 5) is rotatably supported. The control valve 60 includes a valve stem 62 (FIGS. 4 and 6) which is rotatable in the bore 70 under the control of the operating lever 60a (compare FIGS. 2, 4, and 5). The valve stem 62 is centrally drilled to form a central passage or bore 63 (FIG. 6) which connects through a radial passage 64 with a crescent-shaped chamber which is formed between the cam-shaped portion of the valve stem 62 which is indicated at 65 in FIG. 6, and the cylindrical face of the bore 70. A portion of the valve stem 62 (FIG. 6) is cut away through an arc of approximately 90 degrees (FIG. 6) to form the cam-shaped portion 65 of the valve stem 62. Two flow passages 66, and 67 (FIG. 6) are formed in the body of the lower housing 21 (FIG. 6), and either of these flow passages may be connected through the radial passage 64 and central passage or bore 63 to the compressed air inlet passage 35 by way of the flow passage 71, flow groove 40, and passage 55 (FIGS. 5, and 2).

The flow passage 66 (FIGS. 6, 5, and 4), connects with the flow groove 68 formed in the upper face of the flange 21a (FIG. 5), and the flow groove 68 in turn registers with the flow passage 69 (FIGS. 3 and 4) which extends upwardly through the body of the upper housing 720 (FIG. 4) and enters the upper chamber 80 (FIG. 2) through the face of the top wall of the turbine cylinder chamber 83 (FIG. 4). The flow passage 67 extends radially inwards through the body of the lower housing and emerges through the upper face of said lower housing 21 into the turbine cylinder 83 below the turbine 22. When the turbine 22 is rotatably supported in the cylinder chamber 83, it separates the chamber 83 into three principal parts, one occupied by the turbine 22, an upper chamber 80 above the turbine 22, and a lower chamber 81 beneath the turbine 22. The turbine 22 is axially moveable in the turbine cylinder chamber 83 between the upper and lower bearings 39 and 44 so that the turbine 22 constitutes a piston adapted to telescope in the turbine cylinder chamber 83, actuated by the flow of compressed air into the upper chamber 80 above the turbine 22, or by a similar flow of compressed air into the lower chamber 81 below the turbine 22, or by a divided flow of compressed air into the upper, and the lower, chambers 80 and 81. The turbine 22 thus not only functions as a rotor driven by compressed air discharged into the buckets 50, 50 by the air nozzles 47 and 49, but also operates as a piston having two working faces 22a, and 22b, formed by the upper, and the lower, walls, respectively, of the turbine 22 (see FIG. 2).

The supply of compressed air to the working faces of the pistons 22a, and 22b, is controlled by the position of the valve stem 62 (FIG. 6). The two flow passages 66, 67 are approximately 90 degrees apart (FIG. 6), and the crescent-shaped chamber formed between the cylindrical wall of the bore 70 and the cam-shaped portion 65 of the valve stem 62 also extends approximately 90 degrees around the outer face of the valve stem 62, so that in the position shown in FIG. 6, the crescent-shaped chamber bridges the flow passages 66 and 67 and connects both of said flow passages to the radial passage 64 and thence to the compressed air inlet passage 35, to supply compressed air to both working faces 22a, and 22b of the piston-turbine 22.

By turning the operating lever 60a clockwise from the valving position shown in FIG. 6 the crescent-shaped chamber waxes larger in the direction of the flow passage 66 until the radial passage attains a position coaxial with the flow passage 66 thereby applying the full force of the compressed air in the upper chamber 80 and to the working face 22a of the piston-turbine 22, while at the same time restricting the flow passage 67 to the point of cut-off by the sealing action of the cylindrical portion of the outer face of the valve stem 62 and shutting off the supply of compressed air to the lower chamber 81. The piston-turbine while continuing its rotary movement now moves axially downwards in the bearings 39 and 44 to apply increased drilling pressure to the drill 26a and to the work. Conversely, by turning the operating lever 60a counter-clockwise, the radial passage 64 approaches a position coaxial with the flow passage 67 while at the same time restricting the flow passage 66 to the point of cut-off by the sealing action effected by the valve stem 60. An increased supply of compressed air is now connected to the lower chamber 81 to act against the lower working face 22b of the piston-turbine 22, while at the same time the supply of compressed air to the upper chamber 80 is shut off. The piston-turbine now moves axially upwards to lift the drill 26a and suspend the drilling operation.

Thus the direction, and the extent of movement of the operating lever 60a, controls and varies the amount of compressed air supplied through their respective flow passages 69 and 67 (FIG. 4) to the working faces of the pistons 22a and 22b, to control the direction and the extent of movement of the drill 26a.

The extent of movement of the operating lever 60a is determined by the setting of the adjustable stop screws 75 and 76 (FIG. 4 and 2) which engage the opposite sides of the inner end of the operating lever 60a to limit its travel and the extent of rotation of the control valve 60 (FIG. 4), and of its valve stem 62 (FIG. 6). The stop screws 75 and 76 are threaded in the stop plates 73 and 74 respectively, and the stop plates are mounted upon the body of the lower housing 21 by the mounting screws 79, 79 (FIGS. 2 and 5). The control valve 60 is retained in the valve bore 70 by the inturned toe pieces 73a and 74a of the stop plates 73 and 74. The toe pieces 73a, 74a register in the annular groove 61 with a sliding fit so that the valve 60 is free to turn in the bore 70 but cannot be withdrawn therefrom without first dismounting the stop plates 73 and 74 thus disengaging the toe pieces 73a, 74a from the annular groove 61. The inner shoulder of the valve 60 which confines the groove 61 also functions as a retaining ring for the O-ring 72 (FIG. 4) which is mounted upon the valve stem 62 and is compressed between said inner shoulder of the valve 60 and the stepped shoulder of the valve bore 70 to effect an air tight seal. The O-ring 72 may consist of any suitable compressible material; a rubber O-ring gives good results. The coiled springs 77 and 78 which are mounted upon the stop screws 75 and 76 and are positioned between the heads of said stop screws and the outer faces of the stop plates 73 and 74 are maintained under sufficient tension at all times to prevent any accidental change of adjustment of the stop screws.

The spacing between the upper and lower bearings 39 and 44 is such that the axial movement of the piston-turbine or turbine-rotor 22 is so limited that the buckets 50, 50 never travel beyond the air nozzles 47 and 49 or beyond the expansion cavities 51 and 53.

The piston-turbine or turbine-rotor 22 effectively subdivides the turbine hcamber 83 (FIG. 4) into three compartments, namely, an upper chamber 80 (FIG. 2) confined above and by the upper piston 22a, a lower chamber 81 (FIG. 2) confined by and below the lower piston 22b, and an intermediate annular passage confined radially between the inner face of the cylindrical wall of the upper housing 20 and the outer face of the turbine-rotor 22, and constricted at top and bottom by the skirting walls of the pistons 22a and 22b. This annular passage is in constant communication with the exhaust ports 52 and 54 by way of the expansion cavities 51 and 53, so that the pressure of the air in said annular passage is below the pressure of the air supplied to the upper chamber 80, and to the lower chamber 81. This difference in pressure causes the air in the chambers 80 and 81 to bleed along the skirting walls of their respective pistons 22a and 22b into said annular passage and to escape through the exhaust ports 52 and 54. Whenever the turbine-rotor moves axially downwards in the cylinder chamber 83 responsive to an increase in the compressed air supplied to the upper chamber 80 under control of the two-way valve 62, the sealing area between the skirting wall of the piston 22a and the inner face of the cylindrical wall of the upper housing 20 is reduced while at the same time the sealing area between the skirting wall of the piston 22b and the inner face of the cylindrical wall of said housing 20 is increased. Any reduction in the sealing area increases bleeding from the affected chamber, while an increase in the sealing area reduces bleeding from the affected chamber. Thus as the turbine-rotor moves downwards in the cylinder chamber 83 due to an increase in the supply of compressed air to the upper chamber 80 bleeding around the skirting wall of the said piston 22a increases thus tending to reduce the pressure within the chamber 80 while reduced bleeding around the skirting wall of the piston 22b builds up the pressure in the lower chamber 81. The increased pressure in the lower chamber 81 tends to oppose the continued downward movement of the turbine-rotor 22 and balances the turbine-rotor in a free floating position. In this free floating position the resultant of the forces acting upon the turbine-rotor is zero. In the free floating position of the turbine-rotor 22, the air supplied to the upper chamber 80 minus the bleeding around the skirting wall of the piston 22a develops a pressure which is equal and opposite to the pressure developed in the lower chamber 81 by the air supplied thereto minus the bleeding around the skirting wall of the piston 22b.

To drill a hole in the work (not shown), the work is first placed beneath the drill 26a, and the lever arm 60a is moved downwards to increase the supply of compressed air to the upper chamber 80, thus moving the free floating turbine-rotor vertically downwards and bring the drill 26a into contact with the work. At the moment of contact between the drill 26a and the work the turbine-rotor 22 is still in a free floating condition, hence no pressure is being applied to the drill 26a. The continued downward movement of the lever arm 60a increases the air supply to the upper chamber 80, and this tends to move the turbine-rotor downwards against the opposition of the work to the drill, and if the reqiured drilling pressure is present, the drill 26a commences to drill. During the drilling operation, bleeding continues around the skirting walls of both of the pistons 22a and 22b, but as the turbine-rotor continues its downward movement in the cylinder chamber 83, bleeding around the upper piston's skirting wall increases while bleeding around the skirting wall of the lower piston decreases, and when the resultant of all the forces which affect the downward movement of the turbine-rotor is insufficient to provide the required drilling pressure, the drill 26a stops penetrating the work. Due to the elasticity of the air in the upper, and the lower, chambers, 80 and 81, when compressed by the axial movement of the turbine-rotor 22, and the variations in bleeding around the skirting walls of the pistons 22a and 22b during said axial movement of said turbine-rotor, a regulated cushioning of said turbine-rotor is effected.

In an alternative method of drilling, the shaft 29 of the air turbine 18 is mounted in a quill, and the quill travel is used to feed the drill to the work. The use of a quill is advantageous for drilling deep holes in the work. When the shaft 29 is mounted in a quill, the operating handle 60a is set in the down position but with the stop screws so adjusted that in said down position of the handle 60a some compressed air is still supplied to the lower chamber 81 and the turbine-rotor 22 is in a free floating position in proximity to the lower bearing 44 but without physical contact therewith. The quill is then moved downwards until the drill 26a is in contact with the work, and at the moment of such contact the turbine-rotor 22 is still in a free floating condition. As the quill continues its travel, pressure is applied to the drill and this pressure acts in an upward direction and in opposition to the pressure developed in the upper chamber 80 by the compressed air supplied thereto. The turbine-rotor 22 now moves upwards in the chamber 83 and in so doing it increases the sealing area between the skirting wall of the piston 22a and the inner face of the cylindrical wall of the upper housing 20, thus reducing bleeding from the upper chamber 80 and building up the pressure therein, while at the same time reducing the sealing area between the skirting wall of the piston 22b and the inner face of the cylindrical wall of said upper housing 20, thus increasing bleeding from the lower chamber 81 and reducing the pressure therein, and when the resultant of the foregoing pressures acting upon the turbine-rotor 22 develops a force sufficient to provide the required drilling pressure, the drill 26a begins to penetrate the work, and as long as the quill follows the penetration of the drill it continues to provide the required drilling pressure.

It therefore appears that the working pressure applied to the drill can be varied either by varying the supply of compressed air to the upper chamber 80, or by changing the position of the drill relative to the work without changing the flow of compressed air to the upper chamber 80. It also appears that pneumatic cushioning of the turbine-rotor, which cushioning is transmitted to the drill 26a, is effected throughout all stages of the work.

A reference line 84 marked upon the collet sleeve 24 may be read against the calibrations 85 upon the scale of the position measuring plate 86. The plate 86 is attached to the lower housing 21 by machine screws 86a. As the drill 26a moves up or down along the scale the reference line 84 upon the collet sleeve registers with the scale markings 85 to indicate the ratio between the downfeed and the extent of penetration by the drill 26a.

FIGS. 7, 8, and 9, illustrate several suggested automation systems embodying the air turbine 18. In each system the two-way valve 60 is coupled to a device which operates cyclicly to cause the valve 60 to impart axial movement to the turbine rotor 22 (FIG. 1).

In FIG. 7, an endless chain or the like, carrying a series of cams 91 (of which only one is shown) advances, thus causing the cams 91, operating in timed sequence, to actuate the plunger 94 of a three-way air valve 95 and supply air from a compressed air line 92 to a branch pipe 91a connected with one end of a pneumatic cylinder which is separated into two compartments by a double ended pneumatically actuated piston. The piston which is extended to provide a coupling 96 attached to the operating handle of the two-way valve 60 of the air turbine 18, moves up and down under the influence of compressed air to actuate said operating handle and cause the turbine-rotor 22 (FIG. 1) to move in the manner previously described to apply drilling pressure to the drill 26a and against the work, and thereafter to remove the drill from the work during the second half of the operating cycle. This second-half cycle begins when the continued advance of the endless chain allows the plunger 94 to release and exhaust the branch pipe 91a to atmosphere while at the same time supplying compressed air from the air line 92 through the branch pipe 91b to the opposite end of the pneumatic cylinder thus causing the plunger extending from the double ended piston to move the operating handle and the two-way valve 60 in the reverse direction thereby causing the turbine-rotor 22 (FIG. 1) to move axially upwards and remove the drill from the work.

In the modified form shown in FIG. 8, the operating cycle is controlled by a compression spring 100 acting against a cam 101, revolving upon a cam shaft which is rotating at appropriate speed. The compression spring 100 seeks to move the operating handle of the two-way valve 60 into the down position, while the cam 101 lifts the operating handle as its cam shaft revolves, and during this up and down movement of the operating handle the two-way valve 60 causes the turbine-rotor 22 to perform its operating cycle as previously described.

In the modified form shown in FIG. 9, the operating cycle of the turbine-rotor 22 (FIG. 1) of the air turbine 18, is controlled by a solenoid 103 which is energised over an electrical circuit 104 through a switch 105 which opens and closes periodically under control of a plunger 106 which moves up and down as each cam 91 (FIG. 7) of a series, attached to an endless chain or the like passes beneath the plunger 106. The electrical circuit includes a source of electric current (not shown). The solenoid plunger moves up and down as the switch 105 opens and closes to make and break the electrical circuit through the solenoid 103, and the up and down movement of the solenoid plunger in turn, through its coupling 107, actuates the two-way valve 60 through the movement of its operating handle and causes the turbine-rotor 22 of the air-turbine 18 to cycle in the manner previously described.

The air-turbine 18 may be mounted in any standard machine which is thus converted into a machine for accurately drilling small holes at ultra-high speeds (30,000 to 120,000 r.p.m.) in the toughest materials, such as tool steel, and the like. The air turbine is able to drill precision holes with drills as small or as fine as 0.001 inch in tool steel and the like, without breaking the drill, and without the need of special operator skill. The built-in needle valve 30 is quickly adjustable without the use of special tools to any precise setting of drill speed which is best suited to the requirements of the particular work. The vertical feed control or axial movement of the turbine-rotor 22 is adjustable, independently of the drill speed, to suit the drill which is to be used, and once the desired feed control has been adjusted and set, the amount of pressure applied to the drill remains constant, and is entirely independent of "operator feel."

What is claimed is:

1. In a turbine engine and in combination an air chamber, a turbine mounted to rotate in said chamber under the influence of compressed air supplied thereto, said turbine being axially movable in said chamber under the influence of compressed air supplied thereto, means for regulating the supply of compressed air supplied to said chamber to variably control the speed of rotation of said turbine, means enabling said compressed air thus controlled to expand and to exhaust from said air chamber, means for controlling other compressed air supplied to said air chamber above and below said turbine to variably control the extent of the axial movement of said turbine, and means defined in said chamber variably restricting the exhaust of said other compressed air from above and below said turbine in accordance with the axial movement of said turbine in said chamber.

2. The invention as defined in claim 1 wherein the air chamber is provided with bushings, said bushings being spaced apart to define bearings wherein the turbine is mounted to rotate and to move axially, and passageways extending through the wall of said chamber and into said bearings for conveying atomized oil in suspension in compressed air to said bearings to simultaneously lubricate and cool said bearings.

3. The invention as defined in claim 1 wherein the compressed air in passing through said chamber to cause said turbine to rotate generates sounds of high frequency, a muffler encircling said air chamber, said air in exhausting from said chamber passing through said muffler, and said muffler being effective to absorb and to muffle said high frequency sounds.

4. The invention as defined in claim 1 wherein the other compressed air supplied above and below said turbine to variably control the axial movement of the turbine effects a cushioning of its said axial movement in all positions thereof.

5. In a turbine engine and in combination an air chamber, a turbine mounted for rotary and for vertical up-and-down movement in said air chamber when actuated by compressed air, said turbine having upper and lower walls defining upper and lower pistons, means for supplying compressed air to said chamber to rotate said turbine and to vary the speed of rotation thereof, means permitting said supply of compressed air to expand in its passage around said turbine and to exhaust the said air from said chamber, and means for controlling the supply of other compressed air to said chamber above said upper piston and below said lower piston to variably control the vertical up-and-down movement of said turbine, and means defined in said chamber forming a common communication between said chamber above and below said turbine and said air exhaust means to provide a communication for said other compressed air from said chamber to said air exhaust means.

6. The invention as defined in claim 2 wherein the compressed air supplied to the air chamber to control the speed of rotation of said turbine causes the generation of sounds of high frequency, the frequency of said sounds increasing with increases in the speed of rotation of the turbine, a muffler encircling said air chamber, a sound-absorbent material positioned in said muffler and defining a sound filter, said sound filter intercepting the air exhausted from said air chamber, and said sound filter filtering out the sounds of high frequency from said intercepted air.

7. The invention as defined in claim 2 wherein the compressed air supplied to the air chamber to vary the speed of rotation of the turbine expands in its passage around said turbine thereby generating a series of explosions recurring at high frequency, the frequency of said explosions increasing with increases in the speed of rotation of the turbine, a muffler encircling the air chamber to intercept the air exhausted from said air chamber, and a sound absorbent material positioned in said muffler in the exhaust path of said intercepted air.

8. A turbine engine as defined in claim 5 wherein the other compressed air supplied above and below said pistons to variably control the vertical up-and-down movement of the turbine moves through said communication provided by said means defined in said chamber and produces a free floating action upon said turbine in all positions thereof.

9. The invention as defined in claim 5 wherein the vertical up-and-down movement of the pistons causes the compressed air supplied above and below said pistons to bleed past the skirting walls of said pistons through said communication provided by said means defined in said chamber and into said exhaust, said exhaust being a passage defined in said chamber about at least a portion of said turbine, and said bleeding being effective to maintain said turbine in a free floating position through all up-and-down movements thereof.

10. The invention as defined in claim 5 wherein the lower end of the turbine terminates in a shaft which passes through the bottom wall of the air chamber and projects therebeyond, a male threaded collet sleeve mounted upon the lower extremity of said shaft, said collet sleeve having an upwardly tapering opening therein, said tapered opening being coaxial with said shaft, an elastic collet positioned in said tapered opening in said collet sleeve, said collet being reversely tapered, said reverse taper being sized to nest in the tapered opening in said collet sleeve, said collet having a nose at its lower end defining an inverted cone, a female threaded drawcap threadably mounted upon the male thread of said collet sleeve and enclosing then nose of said collet, said drawcap having a central opening therein coaxial with said collet for the passage of the shank of a drill, and said female threaded drawcap being adjustable along said male threaded collet sleeve to compress the nose of said collet, to lock said collet in said collet sleeve and a drill in said collet.

11. In an air-powered drill and in combination, an air chamber, said chamber having an upper end wall, a lower end wall, and an annular side wall positioned therebetween and merging with said upper and lower end walls to complete said air chamber, each of said end walls being journalled to provide an upper bearing and a lower bearing respectively, said bearings being coaxial and adapted to receive a shaft, a shaft journalled in said bearings, said shaft passing through said lower bearing and extending through the lower end wall of said chamber and projecting therebeyond, said shaft terminating in a lower free end, a drill chuck mounted upon the free lower end of said shaft, an air turbine mounted upon said shaft within said air chamber and between said bearings, said air turbine being rotatable with said shaft to drive said drill chuck and being axially movable with said shaft to impart a vertical up-and-down movement to said drill chuck, a common air port passing through the side wall of said chamber and adapted to be connected to a source of compressed air, branch passages extending from said air port through the side wall of said chamber and terminating in close proximity to said air turbine to discharge compressed air against said turbine to rotate said turbine and thus drive said drill chuck, other branch passages extending from said air port through the top and bottom walls of said air chamber to supply compressed air against the top and bottom ends of said air turbine simultaneously to move said air turbine axially and impart pneumatically cushioned vertical up-and-down movement to said drill chuck, and exhaust means defined in said chamber in common communication with air discharged against said turbine and with air supplied against the top and bottom of said turbine to exhaust the same simultaneously from said air chamber.

12. In a motor having a chamber connected with a source of fluid, a turbine movable in said chamber, a plurality of fluid inlets in said chamber each directing the fluid against said turbine, one of said fluid inlets directing the fluid against the turbine to rotate the same and at least another of said plurality of fluid inlets directing the fluid against the turbine to move the same in another direction, and a fluid outlet defined in said chamber and communicating with the fluid of said fluid inlets to simultaneously exhaust the fluid from said plurality of inlets.

13. In a motor having communication with a source of fluid, a chamber connected with said source of fluid, a turbine rotatable and axially movable in said chamber, fluid inlet means defined in said chamber to direct the fluid against said turbine to rotate the same, fluid inlet means defined in said chamber to direct the fluid against said turbine to cause the same to move axially in said chamber, and fluid outlet means in common communication with the fluid directed against said turbine to exhaust the same from said chamber.

14. In a motor having communication with a source of fluid, a chamber including a plurality of relatively spaced fluid inlets each connected with the source of fluid and a fluid outlet to exhaust the fluid from said chamber, and a turbine in said chamber separating at least a certain one of said fluid inlets from said fluid outlet and being movable in the chamber to variably restrict the exhaust of fluid from certain of said fluid inlets through said fluid outlet.

15. In a motor having communication with a source of fluid, a chamber, a turbine movable in said chamber and dividing the same into a plurality of portions one of which has a fluid outlet and at least another one of which has a fluid inlet connected with said source of fluid to direct the same against said turbine to move the same in said chamber, and a passageway defined between said turbine and chamber enabling a variable extent of communication between said fluid inlet and outlet in accordance with the movement of said turbine in said chamber.

16. In a motor having communication with a source of fluid, a chamber, a turbine movable axially and rotatable in said chamber dividing the same into a plurality of compartments, fluid inlet means in said chamber connected with said source of fluid to direct the fluid against said turbine to rotate the same, fluid inlet means in certain of said compartments connected with said source of fluid and directing the same against said turbine to move the turbine relative to the defining walls of said chamber to vary the extent of certain of said compartments, a fluid outlet in constant common fluid exhausting communication with said fluid inlet means, and means operable to control the flow of fluid to said certain compartments through said fluid inlet means thereof whereby when fluid introduced into one of said certain compartments is greater than the fluid introduced into another of said certain compartments said turbine is caused to move relative to the defining walls of said chamber and to variably restrict the exhausting flow of fluid from said certain compartments to said fluid outlet.

17. In a motor having communication with a source of fluid, a chamber, a turbine rotatable and axially movable in said chamber and cooperating therewith to define upper, lower and intermediate portions thereof, said upper and lower portions each having a fluid inlet connected with said source of fluid to supply fluid to said upper and lower portions in variable amounts to cause said turbine to move axially in said chamber, said intermediate portion having a fluid inlet connected with said source of fluid and to supply the fluid against said turbine to rotate the same, a fluid outlet in said intermediate portion to exhaust fluid from said portion, a fluid passage defined between said turbine and chamber providing constant fluid communication between said upper and lower portions and said outlet, whereby fluid supplied to said upper, lower and intermediate portions envelops said turbine.

18. In a motor as in claim 17, means connected with said fluid inlets for said upper and lower portions to vary the relative supply of fluid to said respective portions to correspondingly cause said turbine to move axially in said chamber.

19. In a motor as in claim 17, means connected with said fluid inlet for said intermediate portion to vary the fluid supplied against said turbine to correspondingly vary the speed of rotation thereof.

20. In the method of working materials with a tool connected to a motor having a fluid operated turbine, enveloping said turbine in a fluid by supplying the fluid to a plurality of surfaces thereof, permitting said supplied fluid to flow about said surfaces and completely about said turbine through a passageway defined about said turbine, and exhausting said fluid from said passageway at a common fluid exhaust of less fluid pressure than at said surfaces.

21. In the method as in claim 20, variably restricting the exhausting flow of fluid supplied to one of said surfaces by decreasing the volumetric flow of fluid through the passageway.

References Cited in the file of this patent

UNITED STATES PATENTS

| | | |
|---|---|---|
| 512,527 | Tyler et al. | Jan. 9, 1894 |
| 2,180,993 | Monnier | Nov. 25, 1939 |
| 2,280,115 | Broders et al. | Apr. 21, 1942 |
| 2,382,526 | White | Aug. 14, 1945 |
| 2,496,676 | Rawson | Feb. 7, 1950 |
| 2,643,555 | Steibel | June 30, 1953 |

FOREIGN PATENTS

| | | |
|---|---|---|
| 554,524 | Great Britain | July 7, 1943 |